UNITED STATES PATENT OFFICE.

HIPPOLYTE LEPLAY, OF PARIS, FRANCE.

IMPROVEMENT IN PROCESSES FOR THE DEFECATION OF SACCHARINE SOLUTIONS.

Specification forming part of Letters Patent No. 181,856, dated September 5, 1876; application filed May 11, 1876.

*To all whom it may concern:*

Be it known that I, HIPPOLYTE LEPLAY, of Paris, in the department of Seine, in the Republic of France, chemist, have invented a new and useful "Anticalcic" Compound, which compound is fully described in the following specification:

This invention relates to a compound of chemicals to be used in the defecation and purification of saccharine solutions and juices of sugar-cane; and consists of dicalcic phosphate and phosphate of soda, to be mixed with the saccharine solutions or juices before the lime for defecating is added.

The dicalcic phosphate and the phosphate of soda are prepared in any ordinary or convenient manner, and are mixed together to form my anticalcic compound, in the proportion of three of dicalcic phosphate to one of phosphate of soda.

I mix the said anticalcic compound with the saccharine solutions or juices just before the lime required for defecation is added, the quantity of the said anticalcic compound added varying with the acidity of the saccharine solutions or juices, and with the amount of lime necessary for a good defecation. Under ordinary circumstances, two pounds of anticalcic will suffice for two hundred and twenty gallons of solutions or juices.

The object of mixing the anticalcic compound with the saccharine solutions or juices is to obviate the following disadvantages, which result from the employment of lime alone for defecating: First, the saturation of the free acid of the saccharine solutions or juices by the lime, so as to form a soluble salt of lime; and, second, the reaction of the lime on the uncrystallizable sugar, so as to form a dark-colored acid, which combines with the said lime to form a soluble salt. To the salts of lime above mentioned are mainly due the bad color of the solutions and juices which arise during evaporation and boiling. They also increase the difficulty of reboiling the sirups of the second and third running. They interfere with the crystallization of the sugar, and give rise to incrustations in the apparatus or appliances. The said anticalcic prevents the formation of salts of lime, and destroys any such salts which may previously exist in the solutions or juices.

Saccharine solutions and juices, after treatment as above described, are, after evaporation, of a much better color and clearer than when defecated by lime alone, and the evaporation and boiling are much more easily effected. Moreover, sugar is obtained in greater quantity, is whiter, drier, stronger, more easily separated from the sirup, and of a higher saccharine standard.

The sirup flowing from the sugar of the first running is less slimy, and, when diluted with water to 25° Baumé, can be easily reboiled to give sugar of the second running.

The employment of anticalcic prevents incrustation of the evaporating and boiling tanks, whether heated by fire or steam.

I claim—

The process herein described for the defecation of saccharine solutions and raw juices, the same consisting in mixing a compound of dicalcic phosphate and phosphate of soda with the juices before the lime for defecation is added, substantially as specified.

HIPPOLYTE LEPLAY.

Witnesses:
 D. H. BRANDON,
  13 *Rue Gaillon, Paris.*
 P. TARBURY, 13 *Rue Gaillon, Paris.*